United States Patent
Banik et al.

(10) Patent No.: US 11,768,691 B2
(45) Date of Patent: Sep. 26, 2023

(54) BOOT PROCESS FOR EARLY DISPLAY INITIALIZATION AND VISUALIZATION

(71) Applicant: Intel Corporation, Santa Clara, CA (US)

(72) Inventors: Subrata Banik, Bangalore (IN); Maulik V. Vaghela, Bangalore (IN); Rajaram Regupathy, Bangalore (IN); Vincent Zimmer, Issaquah, WA (US); Asad Azam, El Dorado Hills, CA (US)

(73) Assignee: INTEL CORPORATION, Santa Clara, CA (US)

( * ) Notice: Subject to any disclaimer, the term of this patent is extended or adjusted under 35 U.S.C. 154(b) by 27 days.

(21) Appl. No.: 17/025,350

(22) Filed: Sep. 18, 2020

(65) Prior Publication Data
US 2021/0004241 A1  Jan. 7, 2021

(51) Int. Cl.
*G06F 9/00* (2006.01)
*G06F 15/177* (2006.01)
*G06F 9/4401* (2018.01)
*G06F 12/0811* (2016.01)
*G06F 9/30* (2018.01)

(52) U.S. Cl.
CPC ........ *G06F 9/4403* (2013.01); *G06F 9/30047* (2013.01); *G06F 9/4406* (2013.01); *G06F 12/0811* (2013.01)

(58) Field of Classification Search
CPC ............................ G06F 9/4403; G06F 9/30047
See application file for complete search history.

(56) References Cited

U.S. PATENT DOCUMENTS

| | | | |
|---|---|---|---|
| 2003/0177474 A1* | 9/2003 | de Jong | G06F 9/4482 717/116 |
| 2004/0098575 A1* | 5/2004 | Datta | G06F 12/126 711/E12.075 |
| 2008/0147975 A1* | 6/2008 | Zimmer | G06F 9/4403 711/120 |
| 2008/0162878 A1* | 7/2008 | Zimmer | G06F 9/441 712/203 |
| 2008/0244250 A1 | 10/2008 | Swanson et al. | |

(Continued)

FOREIGN PATENT DOCUMENTS

| | | |
|---|---|---|
| CN | 114201222 A | 3/2022 |
| EP | 3971713 A1 | 3/2022 |
| JP | 202251506 A | 3/2022 |

OTHER PUBLICATIONS

European Patent Application No. 21191559.0 "Extended European Search Report" dated Jan. 25, 2022, 9 pages.

*Primary Examiner* — Mohammed H Rehman
(74) *Attorney, Agent, or Firm* — JAFFERY WATSON MENDONSA & HAMILTON LLP

(57) ABSTRACT

Embodiments are directed to improving boot process for early display initialization and visualization. An embodiment of a system includes a plurality of processor cores; a cache coupled to the plurality of processor cores; and a controller circuit to: initialize a portion of the cache as static memory for hardware initialization code usage before beginning execution of the hardware initialization code after a power on of the hardware processor; and cause initialization of a display device to be performed using the portion of the cache, the initialization of the display device performed independently of initialization of dynamic memory of the hardware processor.

20 Claims, 8 Drawing Sheets

(56) References Cited

U.S. PATENT DOCUMENTS

| | | | |
|---|---|---|---|
| 2014/0223158 A1* | 8/2014 | Zhou | G06F 9/4405 |
| | | | 713/2 |
| 2014/0363144 A1* | 12/2014 | Zhou | G06F 9/4406 |
| | | | 386/355 |
| 2015/0268711 A1* | 9/2015 | Ramani | G06F 12/0808 |
| | | | 713/320 |
| 2016/0253183 A1* | 9/2016 | Swidowski | G06F 9/4401 |
| | | | 713/2 |
| 2017/0168849 A1* | 6/2017 | He | G11C 29/08 |
| 2018/0060231 A1* | 3/2018 | Kelly | G06F 11/1441 |
| 2018/0089096 A1* | 3/2018 | Greenspan | G09G 5/393 |
| 2019/0171274 A1* | 6/2019 | Bhandaru | G06F 1/3243 |
| 2020/0159542 A1* | 5/2020 | Cao | G06F 9/4825 |
| 2020/0167170 A1* | 5/2020 | Hirst | G06F 9/4403 |
| 2020/0387458 A1* | 12/2020 | Villatel | G06F 13/28 |
| 2021/0201986 A1* | 7/2021 | Brandl | G06F 12/0238 |
| 2021/0373907 A1* | 12/2021 | Liang | G06F 9/4408 |

* cited by examiner

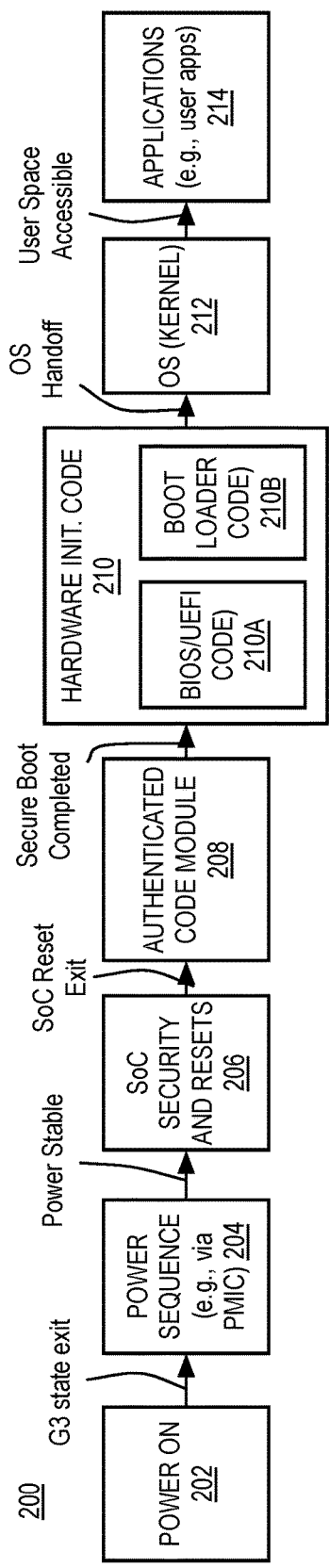
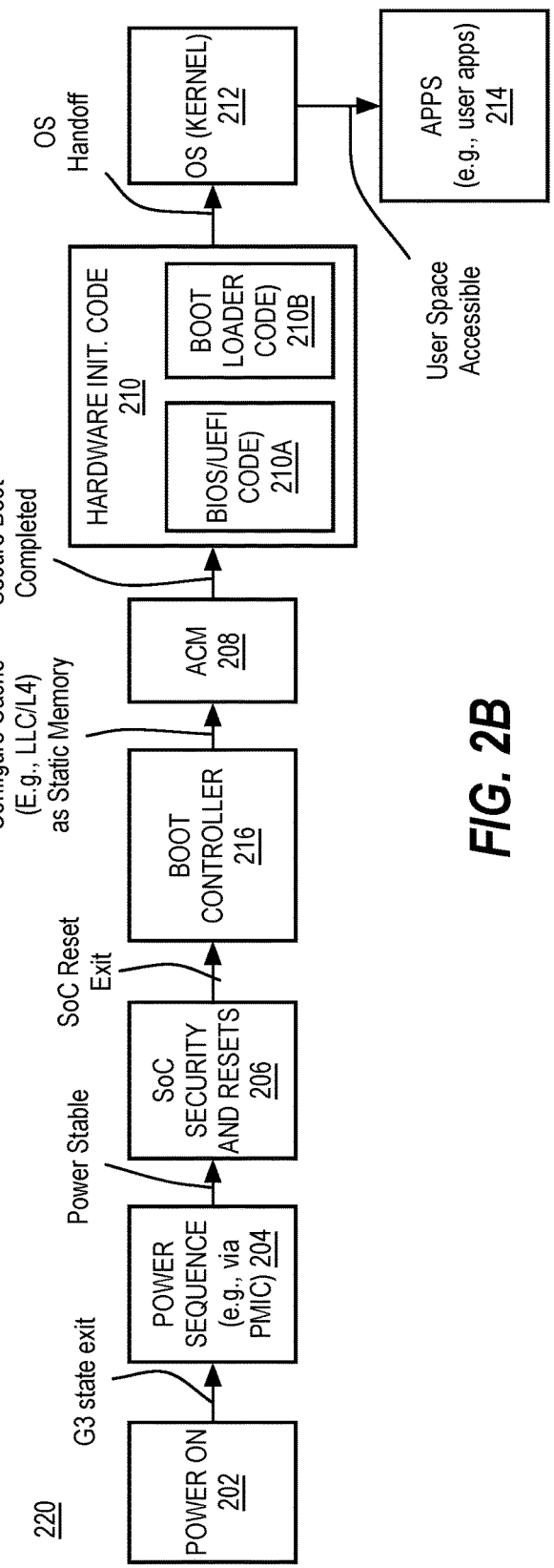
FIG. 2A
FIG. 2B

BOOT PROCESS FOR EARLY DISPLAY INITIALIZATION AND VISUALIZATION

BACKGROUND

A processing system may include hardware and software components. The software components may include one or more applications, an operating system (OS), and firmware. The applications may include control logic for performing the work that is of value to the user of the processing system. In the processing system, the applications run on top of the OS, which runs at a lower logical level than the applications (i.e., closer to the hardware) to provide an underlying environment or abstraction layer that makes it easier to create and execute the applications. The firmware runs at an even lower logical level to provide an underlying environment or abstraction layers which makes it easier to create and execute the OS. For instance, the firmware may establish a basic input/output system (BIOS), and the OS may use that BIOS to communicate with different hardware component within the processing system.

Typically, the OS and the applications execute out of random-access memory (RAM), which is volatile. Some or all of the firmware may also execute out of RAM. However, since the RAM is volatile, the environment for performing useful work basically disappears whenever the processing system is turned off. Consequently, whenever the processing system is turned on, the processing system should recreate that environment before useful work can be performed. For purposes of this disclosure, the operations for preparing a processing system to execute an OS may be referred to as the "boot process." Similarly, the time that elapses during the boot process may be referred to as the "boot time."

BRIEF DESCRIPTION OF THE DRAWINGS

Embodiments described here are illustrated by way of example, and not by way of limitation, in the figures of the accompanying drawings in which like reference numerals refer to similar elements.

FIG. 2A illustrates an example boot flow, according to implementations of the disclosure.

FIG. 2B illustrates an example boot flow utilizing a boot controller that configures a cache for use as memory for hardware initialization code before executing the hardware initialization code, according to implementations of the disclosure.

DETAILED DESCRIPTION

Figure 1:
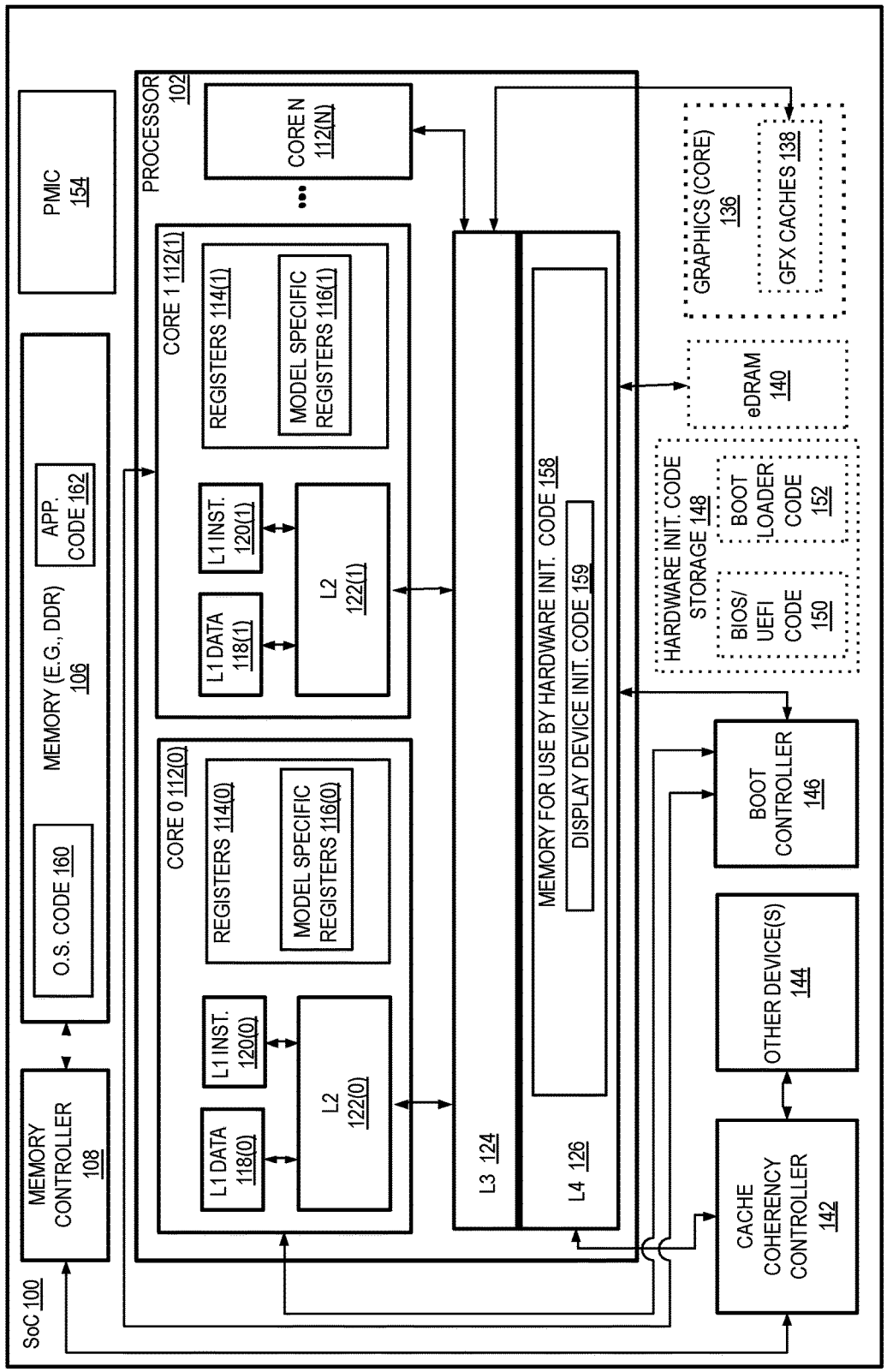
FIG. 1 illustrates a system on a chip (SoC) to improve boot process for early display initialization and visualization, according to implementations of the disclosure.

Embodiments described herein are directed to improving boot process for early display initialization and visualization.

When a processing system is turned on or reset, the processing system may execute a boot process before the processing system can be utilized for work. As discussed herein, the operations for preparing a processing system to execute an OS may be referred to as the "boot process." Similarly, the time that elapses during the boot process may be referred to as the "boot time." The control logic or firmware that performs or controls the boot process may be referred to as the "system firmware," the "system bootcode," the "platform bootcode," or simply the "bootcode."

As part of an enhanced user experience, applications using computer systems may demand instant (e.g., perceptibly instant to a human) system boot up time. Faster system response time is a key performance indicator (KPI) that may be used by original equipment manufacturers (OEMs) and original design manufacturers (ODMs) for their product requirements for various computing sectors, for example, personal devices (e.g., smart phone/tablet/laptop), health care (e.g., ultrasound, defibrillators, and patient monitor devices), industrial (e.g., robots changing arms), military, aerospace, and government (MAG) (e.g., firing a missile, fail-safe redundancy on airplanes, or similar single function devices), and/or office/home automation. In certain uses, the average system (e.g., platform) boot time is expected to be less than a threshold (e.g., 500 ms) from a (e.g., Advanced Configuration and Power Interface (ACPI) standard) (e.g., starting at ACPI "mechanical off" (e.g., "G3" state) system state (e.g., with no power applied) until the operating system (OS) hand off.

On consumer electronics products, a product differentiator is user experience (UX). A general practice for product manufacturers is to enhance UX by providing faster boot up time with prompt system response. Fast system response corresponds to perceived boot up time as measured by time duration until display visualization to the end user. Display visualization to a user is also referred to herein as "display bring up". Example time duration for display bring up can be measured from when the user presses the power button to when the display appears over an associated display panel. Reducing the time duration corresponding to display bring up is correlated to a faster system response from the UX perspective.

For display initialization, a set amount of system memory is used for the display initialization. In one example, for a 4K panel, approximately 68 MB of system memory is utilized for display initialization. In conventional systems, the boot process does not have pre-programmed memory available at processor reset (e.g., central processing unit (CPU) reset) and there is limited cache memory. As a result, until the boot process completes memory, such as dynamic random access memory (DRAM) training and brings up such DRAM, there is not enough memory available for display initialization to utilize for display bring up. This limits conventional systems' ability to enable early boot display and provide faster response time for the UX.

Implementations of the disclosure address the above technical problems by providing an improved boot process for early display initialization and visualization. In one implementation, hardware initialization code (such as basic input/output system (BIOS) and/or Unified Extensible Firmware Interface (UEFI)) is improved by configuring a shared (e.g., L4) cache to be available at processor reset (e.g., CPU reset). In implementations of the disclosure, this shared cache that is available at reset can be utilized to provide a faster pre-reset display bring up. Implementations of the disclosure modify a pre-reset initialization flow of the boot process to initialize at least a portion of the shared cache as static memory (e.g., SRAM) available for platform initialization usage (e.g., usage by the BIOS and/or UEFI). Implementations of the disclosure utilize the shared (e.g., L4) cache that is initialized as static memory for early display initialization independent of DRAM training and initialization during the boot process. For example, the portion of shared (e.g., L4) cache initialized as static memory may be used to store display device initialization code used for early display device initialization and display bring up independent of DRAM training and initialization in implementations of the disclosure.

As such, implementations of the disclosure improve early boot display and provide faster response time for the UX of the processing system. Specifically, implementations of the disclosure can bring up a display much earlier, which provides a better response time and enhances the UX. For example, PCI enumeration and display device initialization can be performed much earlier in the boot process as compared to conventional system where this does not occur until after DRAM training is completed. Furthermore, having static memory available at reset can further assist the boot process in other boot process tasks. Turning now to FIG. 1, an example system on a chip (SOC) is depicted.

FIG. 1 illustrates a system on a chip (SoC) 100 to improve boot process for early display initialization and visualization, according to implementations of the disclosure. SoC 100 includes a boot controller 146. The boot controller 146 may be located within processor 102. Depicted SoC 100 illustrates a hardware processor 102 coupled to a memory 106 via memory controller 108. In one embodiment, the memory 106 of SoC 100 is a system memory (e.g., dynamic random-access memory (DRAM)). Memory controller 108 may be included, e.g., to manage memory requests between the processor 102 and memory 106. In one embodiment, memory controller 108 is to provide (e.g., fill) data (e.g., a cache line) for a miss in the cache(s) (e.g., miss in L3 124, L4 126, or other last level cache (LLC) of processor 102).

Processor 102 may include one or more processor cores 112, e.g., 0 to N where N is a positive integer. In one embodiment, each of a plurality of processor cores have an instance of the circuitry discussed herein. Depicted core 0 112(0) includes a first level (L1) of data cache 118(0), a first level (L1) of instruction cache 120(0), and a level two (L2) cache 122(0). Depicted core 1 112(1) includes a first level (L1) of data cache 118(1), a first level (L1) of instruction cache 120(1), and a level two (L2) cache 122(1).

In some embodiments, as shown in FIG. 1, processor 102 includes one or more next levels (e.g., level three (L3) cache 124 and level four (L4) cache 126 e.g., with L4 the last level cache (LLC) (e.g., the last cache searched before a data item is fetched from memory 106) that is coupled to, and shared by, one or more (e.g., all) of the cores. In certain embodiments, each of L1 data caches 118, L1 instruction caches 120, L2 caches 122, L3 cache 124, and L4 (e.g., LLC) cache 126 are managed by cache coherency controller 142 (e.g., circuitry), e.g., to cache data (e.g., and/or instructions) according to a specified cache coherency.

In certain embodiments, the data (e.g., and/or instructions) stored within the various processor caches are managed at the granularity of cache lines which may be a fixed size (e.g., 64, 128, 512, etc. Bytes in length). Each core 112 may include other components, for example, an instruction fetch circuit for fetching instructions (for example, from (e.g., main) memory 106 via memory controller 106 and/or from the caches; a decode circuit (e.g., decoder or decode unit) for decoding the instructions (e.g., decoding program instructions into micro-operations or "µops"); and an execution unit (e.g., execution circuit) for executing the decoded instructions. Core may include a writeback/retire circuit for retiring the instructions and writing back the results. Depicted core 0 112(0) further includes a set of one or more registers 114(0), for example, having one or more model specific registers 116(0), e.g., as control register(s).

SoC 100 may include one or more other devices 144, (e.g., any device to be initialized before DRAM initialization is attached with cache, such as CSME, GSPI, ESPI, etc.) that are also coupled to cache coherency controller 142. SoC 100 may include graphics circuitry 136 (e.g., a graphics core). In certain embodiments, graphics circuitry 136 includes one or more caches 138, e.g., that are coupled to one or more caches shared with the processor, e.g., L3 cache 124 and/or L4 cache 126. SoC 100 may include an embedded dynamic random-access memory 140 (eDRAM), for example, embedded into SoC 100 with processor 102. In certain embodiments, eDRAM 140 is used as L4 (e.g., LLC) cache 126 (e.g., instead of using an embedded static RAM (eSRAM) for the L4 cache). In certain embodiments, eDRAM 140 is positioned between L3 cache 124 and memory 106 (e.g., DRAM (e.g., Double Data Rate Synchronous DRAM (DDR)), e.g., on a memory bus. SoC 100 may include a power management integrated circuit 154 (PMIC), e.g., to, in response to a power on indication (e.g., pressing of a mechanical on/off switch), provide (e.g., power to the components of the SoC 100.

In some implementations, SoC 100 (e.g., internal or external to processor 102) includes hardware initialization code storage 148. The hardware initialization code may be hardware initialization firmware. In certain embodiments, the hardware initialization code from storage 148, when executed by the processor 102, is to cause the booting up of the SoC 100 (e.g., at least the booting up of the hardware processor 102 thereof).

In some implementations, the hardware initialization code is responsible for transferring control of the computer (e.g., SoC 100) to a program (e.g., OS) stored in memory coupled to the computer.

In some implementations, the hardware initialization code storage 148 includes BIOS and/or UEFI code from storage 150 and boot loader code from storage 152. In certain of those embodiments, the BIOS and/or UEFI (e.g., boot ROM) code is executed as a first stage, and then the boot loader code is executed as a second stage. As one example, BIOS code is according to a BIOS standard. As another example, UEFI code is according to a UEFI standard.

In some implementations, the BIOS and/or UEFI code brings the SoC 100 (e.g., processor 102 thereof) out of (e.g., cold) reset, puts the processor into a known and stable state, and finds the second-stage boot loader code (e.g., from storage 152) and passes control to the next stage. In one embodiment, the BIOS and/or UEFI (e.g., boot ROM) code is aware of the second-stage boot loader code 152 and not aware of any potential subsequent software stages. In certain embodiments, during this time, the BIOS and/or UEFI (e.g., boot ROM) code handles any error conditions.

In some implementations, the boot loader code (e.g., being passed control of the SoC (e.g., processor) when the BIOS and/or UEFI code stage is complete) then locates and loads (e.g., for execution by the processor) the next stage(s) of software (e.g., O.S.) and so on. In one embodiment, before control is passed to the boot loader code, it is decrypted and/or authenticated if secure boot is enabled.

In some implementations, BIOS and/or UEFI (e.g., boot ROM) code, when executed, initializes certain hardware of the SoC, checks integrity, and initializes the (e.g., first level) boot loader code. In some implementations, the boot loader code is, e.g., after being called at the completion of BIOS and/or UEFI (e.g., boot ROM) code execution, executed to cause a handoff of control of the SoC (e.g., processor) to the operating system executing of the SoC. In one implementation, the boot loader code knows where (e.g., the memory location of) the OS kernel image is stored in memory, for example, and loads the OS kernel image for execution.

Although BIOS and/or UEFI (e.g., boot ROM) code storage 150 and boot loader code storage 152 are shown together, in another implementation the BIOS and/or UEFI (e.g., boot ROM) code storage 150 is within processor 102 and the boot loader code storage 152 is separate from the processor 102 (e.g., in storage 148 of SoC 100).

In some implementations, once boot is complete, certain control of the SoC transfers to executing OS code 160 (and/or application code 162). In certain implementations, BIOS/UEFI code 150 includes authenticated code module (ACM) code. In one implementation, ACM code supports the establishment of a measured environment that enables the capability of an authenticated code execution mode, for example, with the ACM code loaded into the processor and executed using a tamper resistant mechanism. Authentication can be achieved by a digital signature in the header of the ACM code, for example, where the processor calculates a hash of the ACM and uses the result to validate the signature, e.g., such that the processor initializes processor state or executes the ACM if it passes authentication.

In implementations of the disclosure, BIOS and/or UEFI, as provided by BIOS/UEFI code 150, are improved by configuring the L4 cache 126 to be available at reset and using this L4 cache 126 that is available at reset to provide a faster pre-reset display bring up. Implementations of the disclosure modify a pre-reset initialization flow of the boot process to initialize at least a portion of the L4 cache 126 as static memory (e.g., SRAM) available for platform initialization usage (e.g., usage by the BIOS and/or UEFI). Implementations of the disclosure utilize the L4 cache 126 that is initialized as static memory for early display initialization independent of DRAM training and initialization during the boot process. For example, the portion 158 of L4 cache 126 initialized as static memory may be used to store display device initialization code 159 used for early display device initialization and display bring up independent of DRAM training and initialization in implementations of the disclosure. Turning now to FIGS. 2A and 2B, example boot flows of a boot process in accordance with implementations of the disclosure are depicted.

FIG. 2A illustrates an example boot flow 200, according to implementations of the disclosure. Depicted flow 200 shows one implementation of an architecture (e.g., Intel® architecture (IA)) platform boot path. For example, from an initial "mechanical off" state (e.g., ACPI G3) to a working state (for example, ACPI G0 sleep state S0 (e.g., working S0 state, and not S0 lower-power idle (e.g., "standby") or partial SoC sleep) boot time flow. The boot flow 200 may include the pre-power (for example, all rails and clock stabilization, e.g., real time clock (RTC)), pre-reset (e.g., power sequencing, reset/security, authenticated code module (ACM), microcode (ucode)/power management code (pcode), etc.), and post central processing unit (CPU) reset (e.g., boot loader) boot path components.

Depicted boot flow 200 includes receiving a power on at 202 (e.g., a G3 state exit), an initial power sequence 204 (e.g., as performed by a PMIC), SoC security and resets 206 (e.g., with the SoC (e.g., reset manager thereof) generating module reset signals based on reset requests from the various sources in the hardware processor system (e.g., processor 102) and any storage (e.g., storage 148), and software writing to the module-reset control registers, e.g., with the reset manager exiting SoC reset when the secure fuses have been loaded and validated), authenticated code module 208 executed to cause secure boot to be completed (e.g., as per IA guideline known as Boot Guard (combination of BIOS guard, TXT, ACM) used to validate other firmware blocks), and then to hardware initialization code 210 (for example, such that BIOS and/or UEFI code 210A from storage 150 and boot loader code 210B from storage 152 are executed, e.g., in series), after the OS handoff, the OS may then execute 212, and one or more (e.g., user) applications may then be executed 214 (e.g., under the control of the OS). Note that blocks 202-214 are merely examples and more or less blocks may be utilized in a boot flow.

In some implementations, the most time-consuming phase of a total boot path is the execution of the code (e.g., firmware) used to perform hardware initialization during the booting process (e.g., sometime referred to as the Basic Input/Output System (BIOS) process), hence making it a phase to optimize to provide a fast boot experience. In certain embodiments, the size of the hardware initialization code (e.g., BIOS/UEFI code and/or boot loader code) grows with more workloads to execute.

Implementations herein provide an improved boot flow utilizing a boot controller (e.g., circuit) that configures a cache for use as memory (e.g., memory 158 in FIG. 1; size of BIOS-configured memory can be pre-allocated between 64 MB-256 MB) for hardware initialization code before executing the hardware initialization code, for example, before entry into any of hardware initialization code (e.g., BIOS code or UEFI code). The improved boot flow of implementations of the disclosure enables utilization of the pre-initialized memory to perform display initialization without being dependent on DRAM resources being trained and initialized by the hardware initialization code.

FIG. 2B illustrates an example boot flow 220 utilizing a boot controller 216 that configures a cache for use as memory for hardware initialization code before executing the hardware initialization code 210, according to implementations of the disclosure. Depicted flow 220 shows one embodiment of an architecture (e.g., Intel® architecture (IA)) platform boot path. For example, from an initial "mechanical off" state (e.g., ACPI G3) to a working state (for example, ACPI G0 sleep state S0 (e.g., working S0 state, and not S0 lower-power idle (e.g., "standby") or partial SoC sleep) boot time flow. The boot flow 220 may include the pre-power (for example, all rails and clock stabilization, e.g., real time clock (RTC)), pre-reset (e.g., power sequencing, reset/security, authenticated code module (ACM), microcode (ucode)/power management code (pcode), etc.), and post central processing unit (CPU) reset (e.g., boot loader) boot path components.

Depicted boot flow 220 includes receiving a power on at 202 (e.g., a G3 state exit), an initial power sequence 204 (e.g., as performed by a PMIC), SoC security and resets 206 (e.g., with the SoC (e.g., reset manager thereof) generating module reset signals based on reset requests from the various sources in the hardware processor system (e.g., processor 102) and any storage (e.g., storage 148), and software writing to the module-reset control registers, e.g., with the reset manager exiting SoC reset when the secure fuses have been loaded and validated), boot controller 216 is to initialize a portion of a cache (e.g., L4 cache) for use by the hardware initialization code 210, authenticated code module 208 executed to ensure secure boot is completed, and then to hardware initialization code 210, for example, such that BIOS and/or UEFI code 210A from storage 150 and boot loader code 210B from storage 152 are executed via use of the portion of the cache (e.g., L4 cache) initialized by boot controller 216, e.g., in parallel), after the OS handoff, the OS may then execute 212, and one or more (e.g., user) applications may then be executed 214 (e.g., under the control of the OS). Note that blocks 202-216 are merely examples and more or less blocks may be utilized in a boot flow.

Also, in some implementations, the (e.g., BIOS/UEFI) hardware initialization (e.g., boot) can take place in a single threaded (e.g., single core executing of a plurality of cores) environment, and results in independent (e.g., input/output (I/O)) initialization waiting for its execution time or turn. In some implementations, hardware initialization code (e.g., BIOS firmware) runs on a single threaded environment because there is not enough pre-initialized memory available at reset and/or (e.g., limited) memory at reset that does not allow a multi-threaded environment. Implementations herein provide for a faster boot process without using cache-as-random-access-memory(RAM) (CAR) that is setup during execution of the hardware initialization code, e.g., with CAR setup being complex and limited. Some implementations herein provide for a faster boot process without having fixed (e.g., static) memory (e.g., static random-access memory (SRAM)) provided for boot (e.g., firmware) space usage. Some implementations herein provide for a faster boot process without using the last level cache (LLC) within a processor (e.g., but can use the LLC of a SoC).

As discussed above, in conventional systems, a platform's boot process does not have pre-programmed memory at (e.g., CPU) reset and is provided with a limited cache memory size leading to an ineffective boot method with a single core processor at reset. This limits this system's ability to initialize the display device and bring up the display until DRAM is available. This, in turn, forces the hardware initialization code (e.g., BIOS/FW) execution to run sequentially leading to a slower boot time and ineffective usage of processor power. As such, the lack of memory to effectively use existing processor power and system resources to provide for a faster boot response (and display bring up time) results in a waste of system resources and a sub-par UX.

Certain implementations herein provide for a compute architecture memory system augmented with several levels of caches, e.g., as shown in FIG. 1. As one example, a memory system includes:

Read-only memory path for (e.g., Open Computing Language (OpenCL) standard) images which includes level-1 (L1) and a level-2 (L2) sampler caches.

Level-3 (L3) data cache as a slice-shared (e.g., by multiple cores) asset. In one embodiment, all read and write actions on (e.g., OpenCL) buffers (e.g., caches) flow through the L3 data cache in units of (e.g., 64-byte wide) cache lines. In one embodiment, the L3 cache includes sampler read transactions that are missing in the L1 and L2 sampler caches, and also supports sampler writes.

System-on-a-chip (SoC) memory hierarchy may include a (e.g., larger) Last-Level Cache (LLC) (e.g., an LLC which is shared between CPU and a graphics processing unit (GPU) (e.g., graphics core 136), system dynamic random-access memory (DRAM) 106, and (optionally) embedded DRAM (eDRAM) 140. This LLC may include a level 4 (L4) cache that is of a larger size and used to improve performance of hybrid ecosystems with CPUs and GPUs, for example.

In some implementations, a level 4 (L4) and/or LLC shared cache is of larger size than for a processor (e.g., CPU) or a GPU only, e.g., to improve performance of hybrid ecosystem with CPU(s) and GPU(s). However, a disconnect in some conventional system is a lack of visibility of this large chunk of L4 and/or LLC cache memory to the boot process, which can make the system resources inefficient. Implementations discussed herein address this disconnect in the memory hierarchy during the boot stage of the system (e.g., prior to executing hardware initialization code, e.g., BIOS/UEFI code).

In some implementations, performance indicators of the UX involve a faster response of a system, including a faster boot time and a faster display bring up time. Certain implementations herein provide a faster ecosystem boot process, e.g., that does not run in a single core due to lack of visibility to cache memory during boot time and thus limits the capability of a multicore processor system. Implementations herein enhance a boot process by extending a (e.g., LLC/L4) cache memory at reset to enable a multicore environment and enable hardware initialization (e.g., boot) code (e.g., firmware) to utilize the LLC/L4 cache for display initialization and early display bring up independent of DRAM training and initialization by the hardware initialization code.

In certain implementations, a SoC's hardware is modified to configure L4 cache as static memory, such as static RAM (SRAM), and/or provide a larger pre-initialized memory at reset for boot firmware. Implementations herein utilize an L4 cache (e.g., persistent memory, such as but not limited to, Intel® Optane™ persistent memory) as memory for use by the hardware initialization code, e.g., before secure boot. In one embodiment, the access time for (e.g., L4) cache is (e.g., significantly) less than the access time for system memory (e.g., DRAM). Embodiments herein provide a section of (e.g., L4) cache to be visible (e.g., at boot time), for example, to enable display initialization and early display bring up independent of DRAM training and initialization by the hardware initialization code.

Certain implementations herein include an on-package (e.g., L4) cache (e.g., from 64 MB-256 MB) (e.g., having an access time that is much less than a DRAM access time, e.g., with a DRAM size of about 4 GB to 32 GB), which is used to improve hardware initialization code (e.g., firmware) and thus boot time and display bring up time. Certain implementations herein provide for (e.g., more) pre-initialized memory at (e.g., power on) reset, for example, as part of a processor (e.g., CPU) reset process (e.g., but not part of a hardware initialization processes (e.g., BIOS process or UEFI process)). Certain embodiments herein provide for (e.g., more) pre-initialized memory at reset to nullify legacy (e.g., x86) BIOS/UEFI assumptions and/or make a faster and more efficient BIOS/UEFI solution for modern device use cases, such as, but not limited to, automotive in-vehicle infotainment (IVI) (e.g., turn on rear view camera within a faster period of time), household robots, industrial robots, etc.

The below discusses two categories of implementations, (1) making (e.g., L4) cache available as part of SRAM and (2) enabling early display initialization and display bring up using shared (e.g., L4) cache as SRAM at reset. In certain implementations of category (1), hardware initialization code (e.g., firmware) is to know SRAM base and limit (max) to make use of it, e.g., where hardware initialization code is to use (e.g., L4) cache for all regular operations like resource allocation etc. instead of DRAM based resource. In some implementations, the portion of L4/LLC cache configured as pre-programmed SRAM is available for hardware initialization code consumption (e.g., use by the code when it executes) and, as such, access time for the (e.g., L4) cache is faster than the DRAM access time, which improves boot time (e.g., by decreasing the total time to execute hardware initialization code).

In certain implementations of category (2), hardware initialization code is modified to utilize the L4/LLC cache configured as SRAM and available at reset. Some implementations thus allow for design/redesign of hardware initialization code (e.g., firmware) to make use of pre-initialized memory to perform display initialization without being dependent on DRAM resources that are trained and initialized by the hardware initialization code subsequent to reset.

In certain implementations, the execution of a processor identification instruction (e.g., CPUID instruction) or reading of a (e.g., dedicated) model specific register (MSR) indicates if the functionality discussed herein is available (e.g., for a particular system/processor).

The following discussion of the two categories of implementations includes methods (e.g., and hardware) that, in certain embodiments, allows the entire (e.g., BIOS or UEFI) hardware initialization (e.g., boot) to take place in a multi-threaded (e.g., multiple core) environment.

In some implementations, platform boot time of a device refers to the total time it takes to show something on the screen of the device after the device is instructed to turn on (e.g., mostly comprised of the BIOS or UEFI booting time (and time for boot loader) plus the OS booting time).

Figure 3:
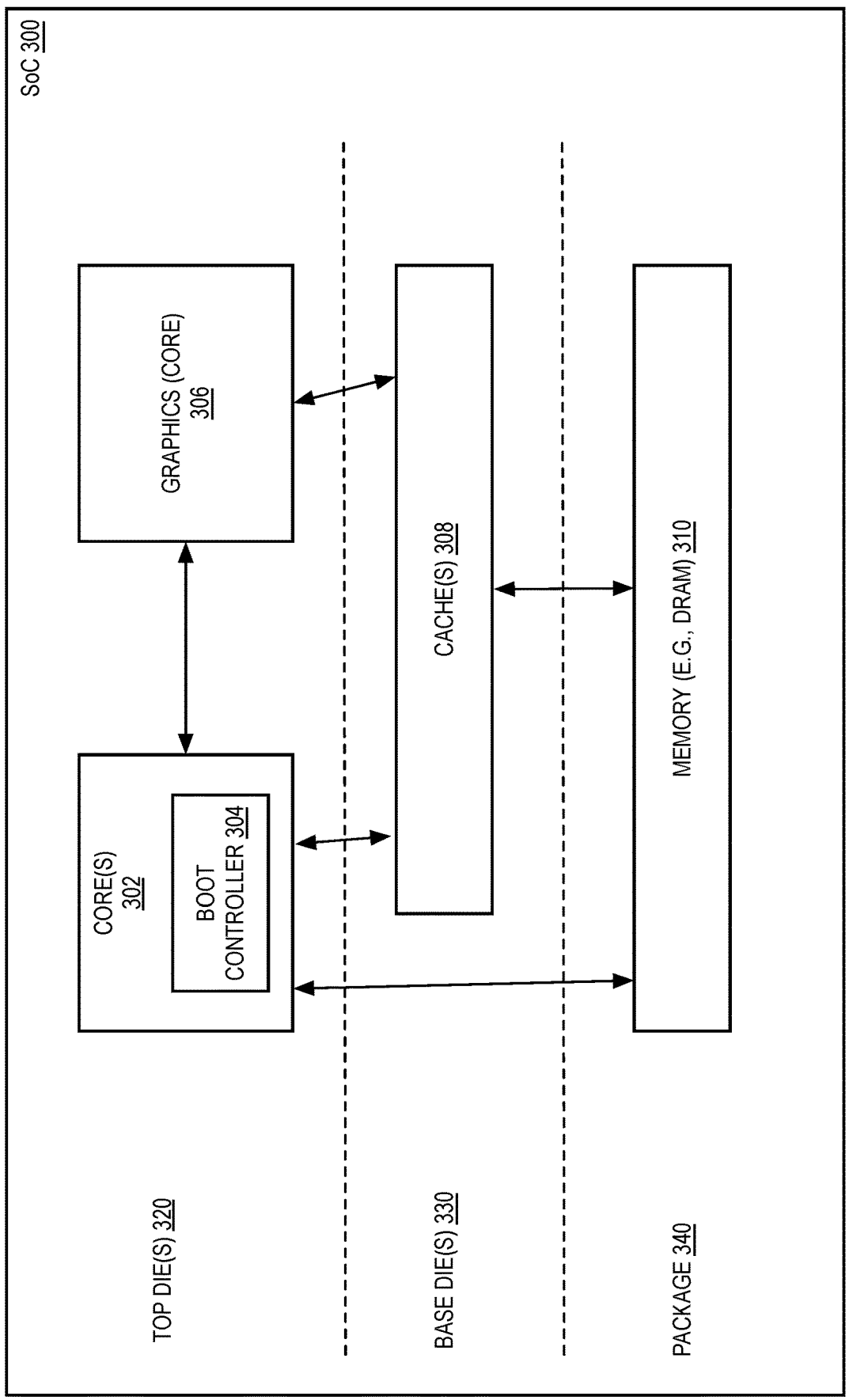
FIG. 3 illustrates a system on a chip (SoC) that includes a shared cache used to improve boot process for early display initialization and visualization, according to implementations of the disclosure.

FIG. 3 illustrates a system on a chip (SoC) 300 that includes a cache 308, such as an L4 cache, used to improve boot process for early display initialization and visualization, according to implementations of the disclosure. Depicted SoC 300 includes one or more cores 302 (e.g., and a boot controller 304 as discussed herein), graphics circuitry 306 (e.g., GFX core), and cache 308 shared by one or more cores 302 and graphics circuitry 306. Depicted core(s) 302 and cache(s) 308 are coupled to memory 310 (e.g., DRAM). For example, with one or more cores 302 and graphics circuitry 306 in a first die(s) of the SoC 300, the cache 308 initialized by the boot controller 304 in a base die(s), and memory 310 (e.g., DRAM) in the package of SoC 300.

Thus, in certain embodiments, the (e.g., L4) cache 308 is shared by (e.g., data) processors and graphics processors, e.g., such that the shared cache (e.g., in the base die of the SoC) is larger in size (e.g., having a size of about 400 MB-700 MB) than a cache used by a (e.g., data) processor. In certain embodiments, one or more coherent memory interfaces (CMIs) are utilized as a coupling between a cache and another component (e.g., CPU and/or GPU). In certain embodiments, a coupling between CPU (e.g., core 302) and GPU 306 is according to a Computer Express Link (CXL) standard.

The following are example hardware and firmware design details for configuring cache, 308, such as L4/LLC cache, as static memory (e.g., SRAM) that is available as system memory used during a hardware initialization (e.g., boot) (e.g., hardware initialization code) phase. One use case of system memory is to allocate resources for devices (e.g., devices coupled together according to a Peripheral Component Interconnect Express (PCI Express) standard) and read kernel blocks from boot devices before booting to an OS. In one implementations, a determined amount of (e.g., about 256 MB-384 MB of) system memory (e.g., initialized by a boot controller) is allocated for hardware initialization code to perform device initializations in a pre-boot environment. For example, a display engine is a PCI device that utilizes around 68 MB of memory for initialization in a pre-boot environment.

In certain implementations, a system (e.g., auxiliary processor core or controller) is to initialize a portion of shared (e.g., L4) cache (as per the discussion herein) for use (e.g., as SRAM) for platform hardware initialization code usage. Optionally, an indication (e.g., via model specific register (MSR)) is provided of the SRAM physical start and limit for hardware initialization code design.

In some implementations, the hardware initialization code flow is modified to refer to a static memory resource for (e.g., PCI) devices to avoid a long waiting time for DRAM-based memory training. The hardware initialization code may allocate memory for a display device and call the display driver for initializing of the display. As multi-core capability is available at reset due to the availability of L4/LLC cache as SRAM, display initialization can run in parallel with other hardware initialization code flows.

In some implementations, additional security lockdown may be provided on top of the SRAM range, e.g., disable/lockdown the "(e.g., L4) cache configured as SRAM" range before booting to OS, e.g., where once disabled/locked, that cannot be overridden without platform reset. In one implementation, a firmware support package (FSP) is to handle this lockdown with an "End of Firmware" boot event.

In implementations of the disclosure, the above-described hardware and/or firmware design changes can use the package (e.g., L4) cache as SRAM for hardware initialization code accesses, e.g., to provide a much larger pre-initialized memory at (e.g., SoC) reset for hardware initialization code to utilize. Firmware flows can also be independent of a DRAM memory training which takes a longer time to initialize, e.g., where access to (e.g., L4) cache memory range is faster than DRAM memory access.

Figure 4:
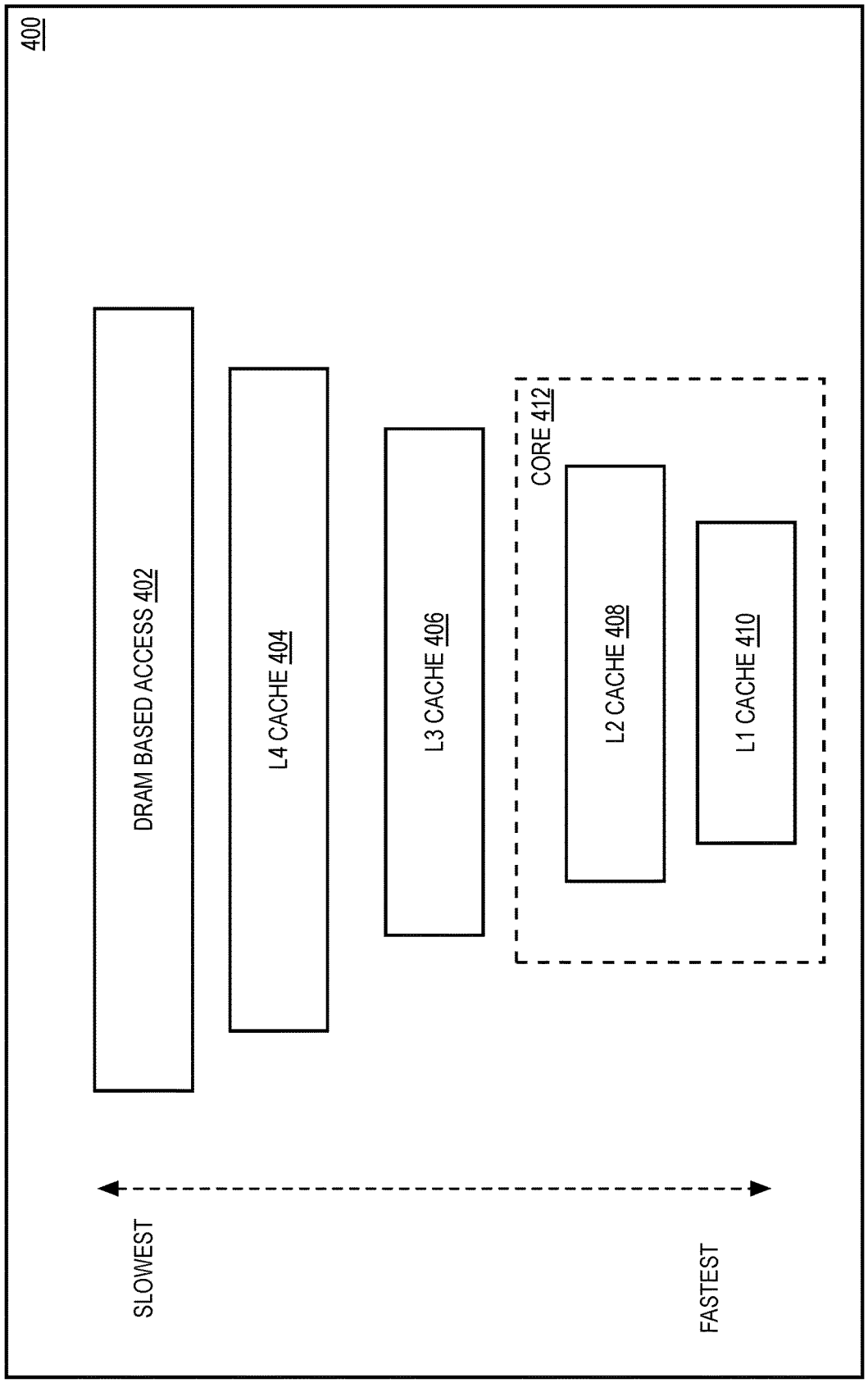
FIG. 4 illustrates a memory hierarchy depicting example response times for memory accesses, according to implementations of the disclosure.

FIG. 4 illustrates a memory hierarchy 400 depicting example response times for access to DRAM 402 and to a plurality of caches 404, 406, 408, 410, according to implementations of the disclosure. Caches may include a L1 cache 410, L2 cache 408 (e.g., both together in core 412), L3 cache 406, and L4 cache 404.

As noted above, implementations of the disclosure can utilize package cache, such as L4 cache, instead of DRAM-based memory accesses owing to the longer time that the DRAM access takes relative to a cache access. In some implementations, shared (e.g., L4) cache is used as a larger and faster memory available at reset, and modifications to the hardware initialization code are made to utilize this pre-initialized memory (rather than define a hardware initialization code (e.g., BIOS or UEFI) flow which has a dependency on DRAM resources). Implementations of the disclosure enable early display initialization and bring up using the shared (e.g., L4) cache as SRAM at reset.

Figure 5:
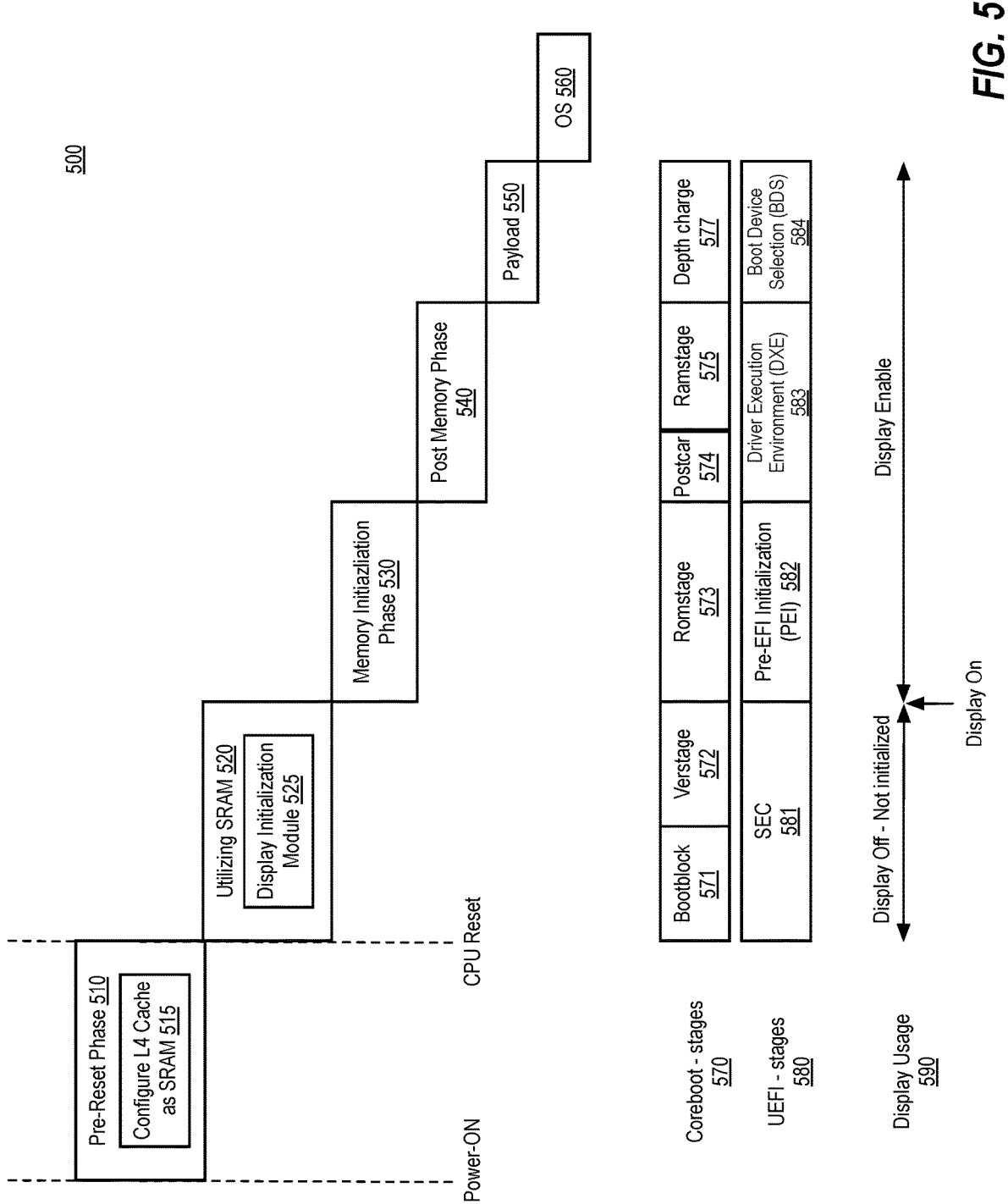
FIG. 5 illustrates a modified firmware boot flow of a system for improving boot process for early display initialization and visualization, in accordance with implementations of the disclosure.

FIG. 5 illustrates a modified firmware boot flow 500 of a system where (e.g., L4) cache is configured as SRAM at pre-reset and all cores (e.g., BSP and APs) are enabled at reset, e.g., without any memory constraint, to optimize hardware initialization code execution (e.g., boot stage) for faster boot process. In implementations of the disclosure, the modified firmware boot flow 500 include a pre-reset phase 510 occurring between power on and CPU reset, a utilizing SRAM 520 phase, a memory initialization phase 530, a post memory phase 540, a payload 550 phase, and an OS runtime phase 560. Pre-reset phase 510 may include power sequencing, reset/security, ACM, ucode/pcode, and so on.

Pre-reset phase 510 may also include a sub-stage 515 for configuring a shared cache (e.g., L4 cache) as static memory (e.g., SRAM). Configuring L4 cache at sub-stage 515 may be performed as described above with respect to FIGS. 2A, 2B, 3, and/or 4. Subsequently, the configured shared (e.g., L4) cache as SRAM may be utilized in a utilizing SRAM stage 520. A display initialization module 525 sub-stage can enable early display initialization and display bring up using the shared (e.g., L4) cache as SRAM at reset, independent on DRAM training and initialization at the memory initialization phase 530. Accordingly, display usage 590 (e.g., display bring up time) is shown in correlation with the modified firmware boot flow 500, and indicates that the display can be brought up for display by the memory initialization phase 530, which is earlier and/or faster than display bring up in conventional systems.

Post-reset coreboot stages 570 and UEFI stages 580 are illustrated in correlation with flow 500. Coreboot stages 570 may include bootblock 571, verstage 572, romstage 573, postCAR 574, ramstage 575, and depth charge stage 577, which are described in further detail below with respect to FIG. 6. UEFI stage 580 may include security (SEC) stage 581, pre-EFI initialization (PEI) stage 582, driver execution environment (DXE) stage 583, and boot device selection (BDS) stage 584.

Example hardware and firmware design details include a shared (e.g., L4) cache that is accessible by processor (e.g., CPU) as part of SRAM, overcoming the limited memory available at reset constraint (e.g., using category (1) embodiments above), and may bring a plurality (e.g., all) cores (e.g., boot strap processor (BSP) and application processors (APs)) from reset early and allocate resources for those cores (e.g., APs the same as the BSP) to perform parallel tasks. Certain embodiments herein disable/lockdown the (e.g., L4) cache range (e.g., cache used as boot SRAM) before booting to OS.

Figure 6:
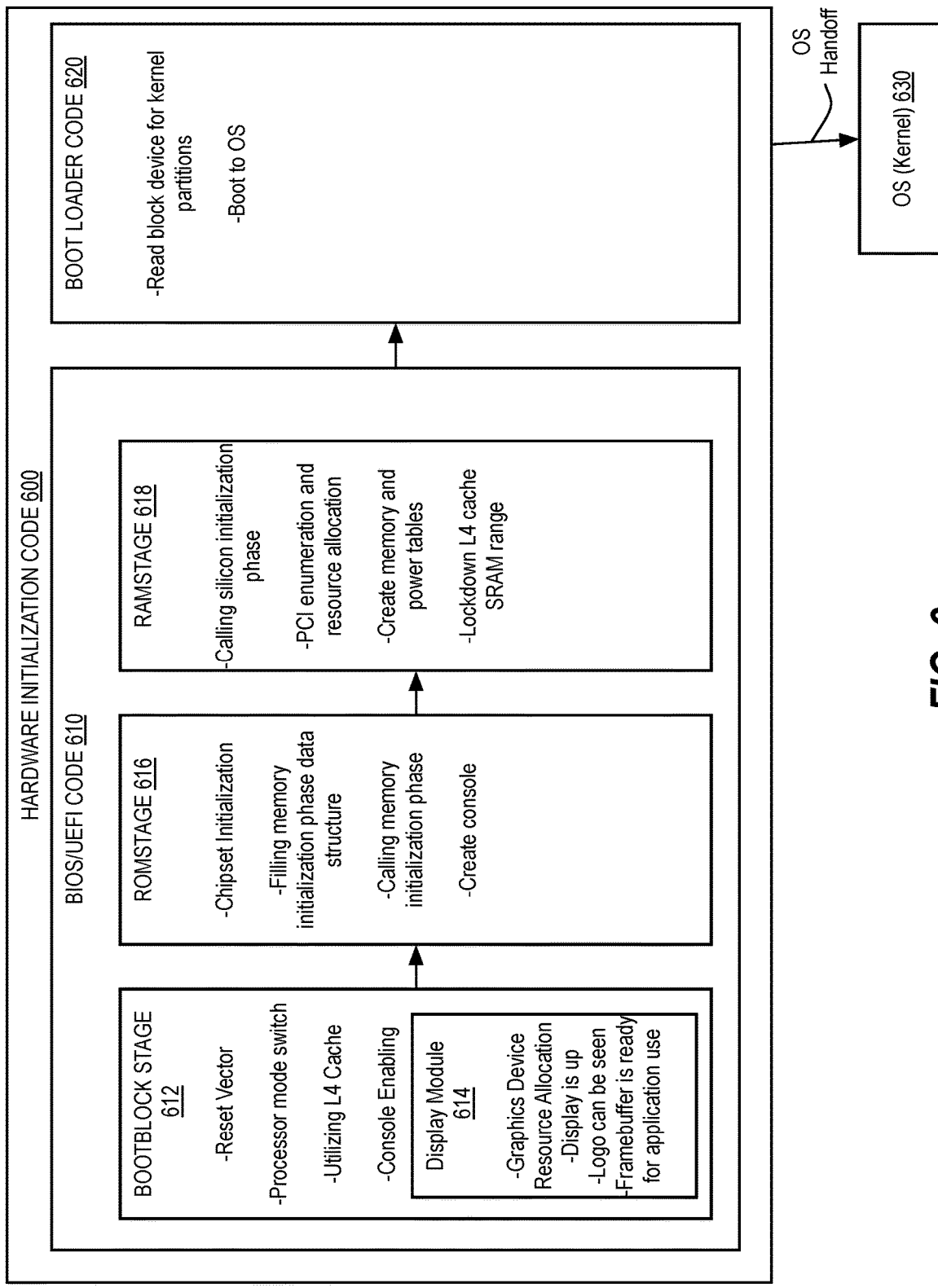
FIG. 6 illustrates an example flow for hardware initialization where cache is configured as static memory before running hardware initialization code, according to implementations of the disclosure.

FIG. 6 discussed below illustrates a modified firmware boot flow of a system where (e.g., L4) cache is configured as SRAM at pre-reset and all cores (e.g., BSP and APs) are enabled at reset, e.g., without any memory constraint, to optimize hardware initialization code execution (e.g., boot stage) for faster boot process.

FIG. 6 illustrates an example flow 600 for hardware initialization where cache (e.g., L4/LLC shared cache) is configured (e.g., by boot controller) as static memory (e.g., SRAM) before running hardware initialization code, according to implementations of the disclosure. In flow 600, BIOS/UEFI code 610 includes a bootblock stage 612, a ROM stage 616, and a RAM stage 618.

For example, bootblock stage 612 includes tasks such as reset vector, processor mode switch, utilizing L4 cache, and/or console enabling. Bootblock stage 612 also includes a display module subblock 614 including graphics device resource allocation, bringing up the display, causing a logo to be seen, and determining that the framebuffer is ready for application use.

ROM stage 616 includes (e.g., processor) chipset initialization, filling memory initialization phase (e.g., FSP-M) data structure, calling the memory initialization phase, and/or creating a console (e.g., CBMEM). RAM stage 618 includes calling a silicon initialization phase (e.g., FSP-S), PCI enumeration and resource allocations, creating memory and power tables for the OS in memory (e.g., e820 and ACPI tables), and locking down the portion of the (e.g., L4) cache used as memory for the hardware initialization code (e.g., SRAM range).

In certain implementations, once BIOS/UEFI code 610 has executed, it causes boot loader code 620 to execute. For example, with boot loader code 620 is to cause read of block devices for kernel partitions, and boot to OS.

In certain implementations, RAM stage 618 is run from (e.g., SPI) mapped memory and using (e.g., L4) cache as memory (e.g., SRAM) and all context is moved into DRAM mapped memory before jumping to boot loader code 620 from BIOS/UEFI code 610.

In the depicted implementation, once the hardware initialization code 610 is complete, the OS handoff is performed to transfer control of the system (e.g., processor) to the OS 630 (e.g., OS kernel). An example security policy is to lock down that SRAM memory range used by the hardware initialization code before booting to operating system.

As discussed above and depicted in the foregoing illustrations, implementations of the disclosure enable early display initialization and display bring up using shared (e.g., L4) cache as SRAM at reset. As such, implementations utilize a (e.g., larger than L1, L2, or L3 caches) pre-initialized memory at reset for hardware initialization code to utilize. Hardware initialization code (e.g., firmware) flows can be independent of DRAM memory training, e.g., which takes a longer time to initialize. Early hardware initialization code stages (e.g., before DRAM initialization) can be avoided in order to reduce hardware initialization code footprint. An auxiliary processor core and/or controller (e.g., microcontroller) inside the SoC can initialize the (e.g., L4) cache as SRAM, for example, without requiring use of a (e.g., IA) processor (e.g., BSP) core. In certain implementations, memory (e.g., L4 cache) is available before any (e.g., processing) core is released from reset.

Certain implementations do not use cache-as-ram (CAR) ("tempRAM init") in hardware initialization code flow, e.g., to reduce complicated assembly programming in bootloader space. Implementations allow CPU, chipset, and PCI enumeration to be performed early without being dependent over DRAM initialization, and instead make use of SRAM to do all CPU/chipset programming. Implementations of the disclosure allow CAR tear down logic to be avoided.

Implementations of the disclosure carve out a larger portion of memory from an L4 cache-SRAM bucket for an early display initialization use case. Certain implementations initialize SRAM based memory resources to an Integrated Graphics device for memory related device register accesses. Some implementations map UMA base from SRAM-based memory based on maximum resolution support. In implementations of the disclosure, GTT is built up based on the UMA base.

Implementations allocate graphics stolen memory as per device conditions. In an integrated graphics device, all base address register (BAR) access registers are implemented with pre-requisite SRAM mapped memory.

In some implementations, control can be transferred into GOP/Graphics PEIM module for further device related programming. The further device-related programming may include, but is not limited to, as per UEFI specification framebuffer is setup at linear mode which is pointed towards L4 cache-SRAM memory; framebuffer is accessed via PCI aperture which is programed during initialization of the SRAM; access graphics core device base address register; perform clock programming; initialize clock PLL programming; set display clock frequency; identified the endpoint port for display panel initialization; set the supported mode as per UMA size; and/or execute recommended display panel training.

In implementations of the disclosure, subsequent to the device-related programming, the bootloader can see display framebuffer address and size been programmed along with supported resolutions and display clock. Any further application can now directly access the framebuffer address for display purpose.

Certain implementations allow CAR tear down logic to be avoided. Certain implementations avoid switching between temporary memory (e.g., CAR) to permanent memory (e.g., DRAM based) in boot (e.g., boot loader) space and entire boot loader execution can be driven out of SRAM based fixed memory. Certain implementations perform DRAM initialization at end of hardware initialization code (e.g., boot loader) sequence, e.g., to ensure payload or OS can use DRAM based resources for higher memory use cases.

Certain implementations allow all cores to be available at reset and BSP may bring APs in operable condition early without any memory bottleneck. Certain implementations allow hardware initialization code (e.g., BIOS/UEFI) to run on a multi-threaded (e.g., multiple core) environment. Certain implementations allow the execution of a firmware support package (e.g., FSP-M for DRAM initialization and FSP-S for chipset initialization) over parallel threads to optimize boot time. Certain implementations allow an entire hardware initialization code (e.g., firmware) boot sequence to be spread across all cores and execution happening over parallel threads, for example, (i) boot event of bootstrap processor (BSP) for handling reset vector, processor mode switching, console enabling, creating bootloader memory layout, and chipset initialization, (ii) boot event of one AP core (e.g., AP0, AP1 . . . APn, where n=index to the maximum core available) for filling configuration parameter(s) to initialize DRAM, e.g., FSP-M, running memory reference code (MRC) to initialize DRAM, running independent security boot operations (e.g., verified boot), initializing independent I/O programming (e.g., embedded Multi-Media Controller (eMMC), trusted platform module (TPM), Embedded Controller, etc.), and (iii) Boot event of another AP core (e.g., AP0, AP1 APn,) for filling configuration parameter to initialize hardware blocks, e.g., FSP-S, running FSP-S for detailed chipset initialization, reading kernel partitions from block device use for booting OS, and locking down the portion of cache (e.g., L4 SRAM range) used by execution of the hardware initialization code for security compliance.

Figure 7:
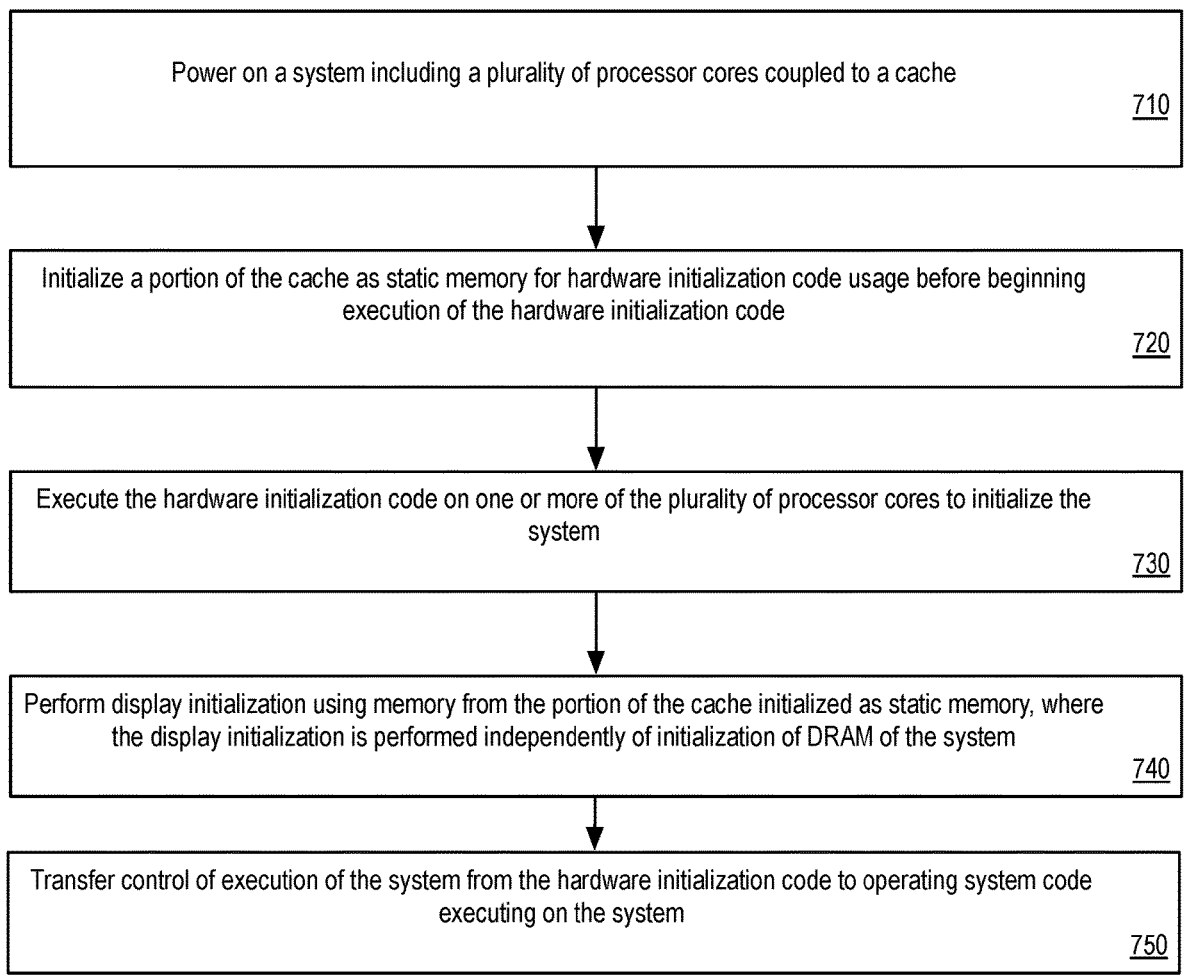
FIG. 7 is a flow diagram illustrating operations for improving boot process for early display initialization and visualization, according to implementations of the disclosure.

FIG. 7 is a flow diagram illustrating operations 700 for improving boot process for early display initialization and visualization, according to implementations of the disclosure. Some or all of the operations 700 (or other processes described herein, or variations, and/or combinations thereof) are performed under the control of one or more computer components configured to execute and are implemented as code (e.g., executable instructions, one or more computer programs, or one or more applications). The code is stored on a computer-readable storage medium, for example, in the form of a computer program comprising instructions executable by one or more processors. The computer-readable storage medium is non-transitory. In some embodiments, one or more (or all) of the operations 700 are performed by a boot service.

The operations 700 include, at block 710, powering on a system comprising a plurality of processor cores coupled to a cache. The operations 700 further include, at block 720, initializing, by a controller of the system, a portion of the cache as static memory for hardware initialization code usage before beginning execution of the hardware initialization code. The operations 700 further include, at block 730, executing the hardware initialization code on one or more of the plurality of processor cores to initialize the system.

The operations 700 further include, at block 740, performing display initialization using memory from the portion of the cache initialized as static memory. In one implementation, the display initialization is performed independently of initialization of DRAM of the system. The operations 700 further include, at block 750, transferring control of execution of the system from the hardware initialization code to operating system code executing on the system.

Figure 8:
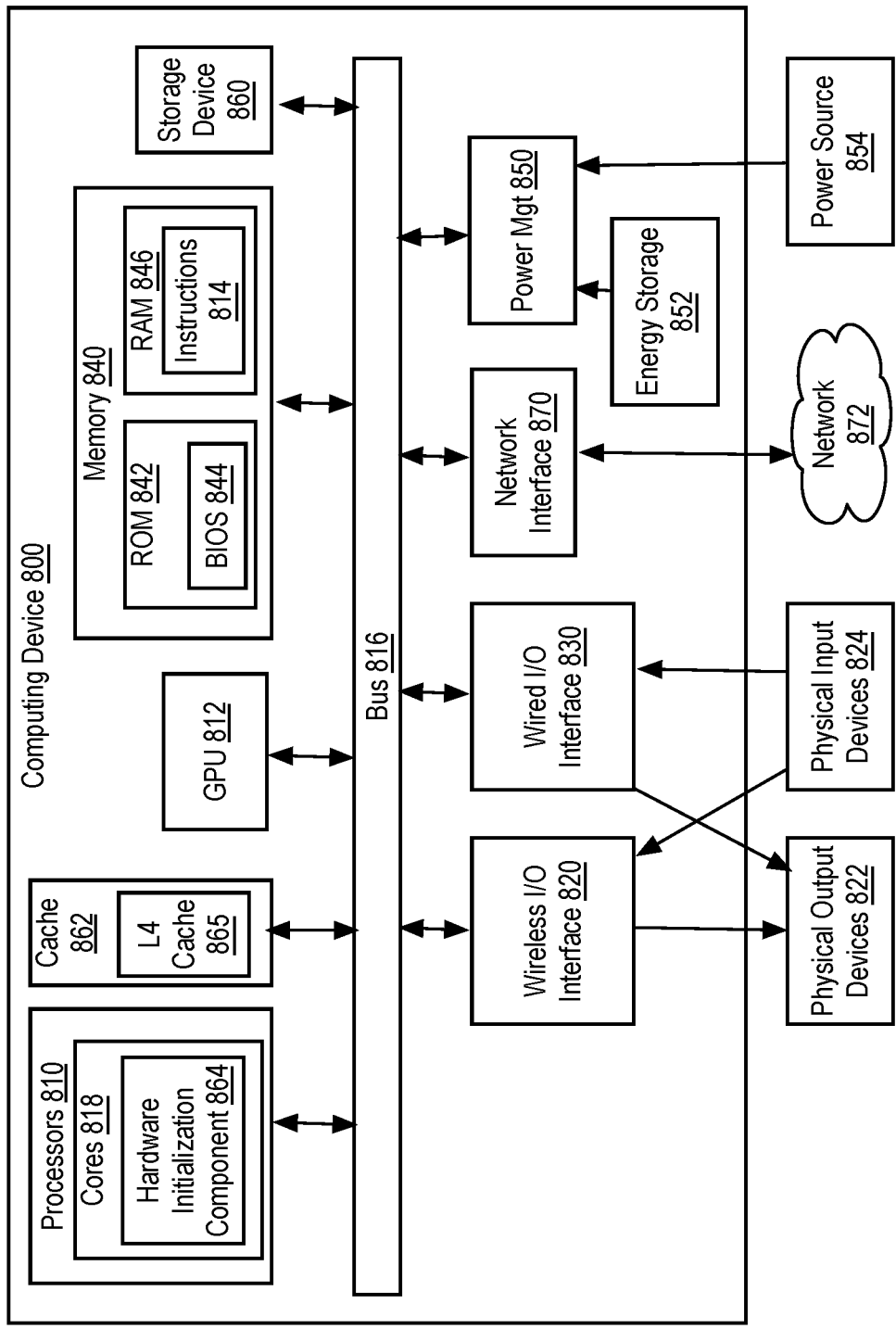
FIG. 8 is a schematic diagram of an illustrative electronic computing device to enable improving boot process for early display initialization and visualization, in accordance with implementations of the disclosure.

FIG. 8 is a schematic diagram of an illustrative electronic computing device to enable improving boot process for early display initialization and visualization, according to some embodiments. In some embodiments, the computing device 800 includes one or more processors 810 including one or more processors dies (e.g., cores) 818 each including a hardware initialization component 864, such as a component to execute hardware initialization code, including BIOS/UEFI coder 150 and/or bootloader code 152 described with respect to FIG. 1. In some embodiments, the computing device is to provide improved boot process for early display initialization and visualization using L4 cache 865 associated with cache 862, as provided in FIGS. 1-7.

The computing device 800 may additionally include one or more of the following: cache 862, a graphical processing unit (GPU) 812 (which may be the hardware accelerator in some implementations), a wireless input/output (I/O) interface 820, a wired I/O interface 830, system memory 840 (e.g., memory circuitry), power management circuitry 850, non-transitory storage device 860, and a network interface 870 for connection to a network 872. The following discussion provides a brief, general description of the components forming the illustrative computing device 800. Example, non-limiting computing devices 800 may include a desktop computing device, blade server device, workstation, or similar device or system.

In embodiments, the processor cores 818 are capable of executing machine-readable instruction sets 814, reading data and/or instruction sets 814 from one or more storage devices 860 and writing data to the one or more storage devices 860. Those skilled in the relevant art will appreciate that the illustrated embodiments as well as other embodiments may be practiced with other processor-based device configurations, including portable electronic or handheld electronic devices, for instance smartphones, portable computers, wearable computers, consumer electronics, personal computers ("PCs"), network PCs, minicomputers, server blades, mainframe computers, and the like.

The processor cores 818 may include any number of hardwired or configurable circuits, some or all of which may include programmable and/or configurable combinations of electronic components, semiconductor devices, and/or logic elements that are disposed partially or wholly in a PC, server, or other computing system capable of executing processor-readable instructions.

The computing device 800 includes a bus or similar communications link 816 that communicably couples and facilitates the exchange of information and/or data between various system components including the processor cores 818, the cache 862, the graphics processor circuitry 812, one or more wireless I/O interfaces 820, one or more wired I/O interfaces 830, one or more storage devices 860, and/or one or more network interfaces 870. The computing device 800 may be referred to in the singular herein, but this is not intended to limit the embodiments to a single computing device 800, since in certain embodiments, there may be more than one computing device 800 that incorporates, includes, or contains any number of communicably coupled, collocated, or remote networked circuits or devices.

The processor cores 818 may include any number, type, or combination of currently available or future developed devices capable of executing machine-readable instruction sets.

The processor cores 818 may include (or be coupled to) but are not limited to any current or future developed single- or multi-core processor or microprocessor, such as: on or more systems on a chip (SOCs); central processing units (CPUs); digital signal processors (DSPs); graphics processing units (GPUs); application-specific integrated circuits (ASICs), programmable logic units, field programmable gate arrays (FPGAs), and the like. Unless described otherwise, the construction and operation of the various blocks shown in FIG. 8 are of conventional design. Consequently, such blocks are not described in further detail herein, as they should be understood by those skilled in the relevant art. The bus 816 that interconnects at least some of the components of the computing device 800 may employ any currently available or future developed serial or parallel bus structures or architectures.

The system memory 840 may include read-only memory ("ROM") 842 and random access memory ("RAM") 846. A portion of the ROM 842 may be used to store or otherwise retain a basic input/output system ("BIOS") 844. The BIOS 844 provides basic functionality to the computing device 800, for example by causing the processor cores 818 to load and/or execute one or more machine-readable instruction sets 814. In embodiments, at least some of the one or more machine-readable instruction sets 814 cause at least a portion of the processor cores 818 to provide, create, produce, transition, and/or function as a dedicated, specific, and particular machine, for example a word processing machine, a digital image acquisition machine, a media playing machine, a gaming system, a communications device, a smartphone, or similar.

The computing device 800 may include at least one wireless input/output (I/O) interface 820. The at least one wireless I/O interface 820 may be communicably coupled to one or more physical output devices 822 (tactile devices, video displays, audio output devices, hardcopy output devices, etc.). The at least one wireless I/O interface 820 may communicably couple to one or more physical input devices 824 (pointing devices, touchscreens, keyboards, tactile devices, etc.). The at least one wireless I/O interface 820 may include any currently available or future developed wireless I/O interface. Example wireless I/O interfaces include, but are not limited to: BLUETOOTH®, near field communication (NFC), and similar.

The computing device 800 may include one or more wired input/output (I/O) interfaces 830. The at least one wired I/O interface 830 may be communicably coupled to one or more physical output devices 822 (tactile devices, video displays, audio output devices, hardcopy output devices, etc.). The at least one wired I/O interface 830 may be communicably coupled to one or more physical input devices 824 (pointing devices, touchscreens, keyboards, tactile devices, etc.). The wired I/O interface 830 may include any currently available or future developed I/O interface. Example wired I/O interfaces include, but are not limited to, universal serial bus (USB), IEEE 1394 ("FireWire"), and similar.

The computing device 800 may include one or more communicably coupled, non-transitory, data storage devices 860. The data storage devices 860 may include one or more hard disk drives (HDDs) and/or one or more solid-state storage devices (SSDs). The one or more data storage devices 860 may include any current or future developed storage appliances, network storage devices, and/or systems. Non-limiting examples of such data storage devices 860 may include, but are not limited to, any current or future developed non-transitory storage appliances or devices, such as one or more magnetic storage devices, one or more optical storage devices, one or more electro-resistive storage devices, one or more molecular storage devices, one or more quantum storage devices, or various combinations thereof. In some implementations, the one or more data storage devices 860 may include one or more removable storage devices, such as one or more flash drives, flash memories, flash storage units, or similar appliances or devices capable of communicable coupling to and decoupling from the computing device 800.

The one or more data storage devices 860 may include interfaces or controllers (not shown) communicatively coupling the respective storage device or system to the bus 816. The one or more data storage devices 860 may store, retain, or otherwise contain machine-readable instruction sets, data structures, program modules, data stores, databases, logical structures, and/or other data useful to the processor cores 818 and/or graphics processor circuitry 812 and/or one or more applications executed on or by the processor cores 818 and/or graphics processor circuitry 812. In some instances, one or more data storage devices 860 may be communicably coupled to the processor cores 818, for example via the bus 816 or via one or more wired communications interfaces 830 (e.g., Universal Serial Bus or USB); one or more wireless communications interfaces 820 (e.g., Bluetooth®, Near Field Communication or NFC); and/or one or more network interfaces 870 (IEEE 802.3 or Ethernet, IEEE 802.11, or Wi-Fi®, etc.).

Processor-readable instruction sets 814 and other programs, applications, logic sets, and/or modules may be stored in whole or in part in the system memory 840. Such instruction sets 814 may be transferred, in whole or in part, from the one or more data storage devices 860. The instruction sets 814 may be loaded, stored, or otherwise retained in system memory 840, in whole or in part, during execution by the processor cores 818 and/or graphics processor circuitry 812.

The computing device 800 may include power management circuitry 850 that controls one or more operational aspects of the energy storage device 852. In embodiments, the energy storage device 852 may include one or more primary (i.e., non-rechargeable) or secondary (i.e., rechargeable) batteries or similar energy storage devices. In embodiments, the energy storage device 852 may include one or more supercapacitors or ultracapacitors. In embodiments, the power management circuitry 850 may alter, adjust, or control the flow of energy from an external power source 854 to the energy storage device 852 and/or to the computing device 800. The power source 854 may include, but is not limited to, a solar power system, a commercial electric grid, a portable generator, an external energy storage device, or any combination thereof.

For convenience, the processor cores 818, the graphics processor circuitry 812, the wireless I/O interface 820, the wired I/O interface 830, the storage device 860, and the network interface 870 are illustrated as communicatively coupled to each other via the bus 816, thereby providing connectivity between the above-described components. In alternative embodiments, the above-described components may be communicatively coupled in a different manner than illustrated in FIG. 8. For example, one or more of the above-described components may be directly coupled to other components, or may be coupled to each other, via one or more intermediary components (not shown). In another example, one or more of the above-described components may be integrated into the processor cores 818 and/or the graphics processor circuitry 812. In some embodiments, all or a portion of the bus 816 may be omitted and the components are coupled directly to each other using suitable wired or wireless connections.

The following examples pertain to further embodiments. Example 1 is an apparatus to facilitate improving boot process for early display initialization and visualization. The apparatus of Example 1 comprises a hardware processor comprising: a plurality of processor cores; a cache coupled to the plurality of processor cores; and a controller circuit to: initialize a portion of the cache as static memory for hardware initialization code usage before beginning execution of the hardware initialization code after a power on of the hardware processor; and cause initialization of a display device to be performed using the portion of the cache, the initialization of the display device performed independently of initialization of dynamic memory of the hardware processor.

In Example 2, the subject matter of Example 1 can optionally include wherein the hardware initialization code is according to a Basic Input/Output System standard. In Example 3, the subject matter of any one of Examples 1-2 can optionally include wherein the hardware initialization code is according to a Unified Extensible Firmware Interface standard. In Example 4, the subject matter of any one of Examples 1-3 can optionally include wherein the hardware initialization code executes on the plurality of processor cores in parallel using the portion of the cache as the static memory.

In Example 5, the subject matter of any one of Examples 1-4 can optionally include wherein the cache is shared by the plurality of processor cores and a graphics core. In Example 6, the subject matter of any one of Examples 1-5 can optionally include wherein the cache is an L4 cache. In Example 7, the subject matter of any one of Examples 1-6 can optionally include wherein the dynamic memory comprises dynamic random access memory (DRAM). In Example 8, the subject matter of any one of Examples 1-7 can optionally include wherein the portion of the cache as the static memory is locked down subsequent to execution of the hardware initialization code to prevent access to the portion.

Example 9 is a non-transitory computer-readable storage medium for facilitating improving boot process for early display initialization and visualization. The at non-transitory computer-readable storage medium of Example 9 comprises executable computer program instructions that, when executed by one or more processors, cause the one or more processors to perform operations comprising: powering on a system comprising a plurality of processor cores coupled to a cache; initializing, by a controller of the system, a portion of the cache as static memory for hardware initialization code usage before beginning execution of the hardware initialization code; executing the hardware initialization code on one or more of the plurality of processor cores to initialize the system; performing display initialization using memory from the portion of the cache initialized as the static memory, the display initialization performed independently of initialization of dynamic memory of the system; and transferring control of execution of the system from the hardware initialization code to operating system code executing on the system.

In Example 10, the subject matter of Example 9 can optionally include wherein the hardware initialization code is according to a Basic Input/Output System standard. In Example 11, the subject matter of any one of Examples 9-10 can optionally include wherein the hardware initialization code is according to a Unified Extensible Firmware Interface standard. In Example 12, the subject matter of any one of Examples 9-11 can optionally include wherein the executing comprises executing the hardware initialization code on the plurality of processor cores in parallel using the portion of the cache as the static memory to initialize the system.

In Example 13, the subject matter of any one of Examples 9-12 can optionally include wherein the cache is shared by the plurality of processor cores and a graphics core. In Example 14, the subject matter of any one of Examples 9-13 can optionally include wherein the dynamic memory comprises dynamic random access memory (DRAM). In Example 15, the subject matter of any one of Examples 9-14 can optionally include wherein the portion of the cache as the static memory is locked down subsequent to execution of the hardware initialization code to prevent access to the portion.

Example 16 is a system to improving boot process for early display initialization and visualization. The system of Example 16 comprises a hardware processor comprising a plurality of processor cores; a cache coupled to the hardware processor; storage for hardware initialization code; and a controller circuit to: initialize a portion of the cache as static memory for hardware initialization code usage before beginning execution of the hardware initialization code after a power on of the hardware processor; and cause initialization of a display device to be performed using the portion of the cache, the initialization of the display device performed independently of initialization of dynamic memory of the hardware processor.

In Example 17, the subject matter of Example 16 can optionally include wherein the hardware initialization code is according to a Basic Input/Output System standard. In Example 18, the subject matter of any one of Examples 16-17 can optionally include wherein the hardware initialization code is according to a Unified Extensible Firmware Interface standard. In Example 19, the subject matter of any one of Examples 16-18 can optionally include wherein the hardware initialization code executes on the plurality of processor cores in parallel using the portion of the cache as the memory. In Example 20, the subject matter of any one of Examples 16-19 can optionally include further comprising a graphics core, and the cache is shared by the plurality of processor cores and the graphics core.

Example 21 is a method for facilitating improving boot process for early display initialization and visualization. The method of Example 21 can optionally include powering on a system comprising a plurality of processor cores coupled to a cache; initializing, by a controller of the system, a portion of the cache as static memory for hardware initialization code usage before beginning execution of the hardware initialization code; executing the hardware initialization code on one or more of the plurality of processor cores to initialize the system; performing display initialization using memory from the portion of the cache initialized as the static memory, the display initialization performed independently of initialization of dynamic memory of the system; and transferring control of execution of the system from the hardware initialization code to operating system code executing on the system.

In Example 22, the subject matter of Example 21 can optionally include wherein the hardware initialization code is according to a Basic Input/Output System standard. In Example 23, the subject matter of any one of Examples 21-22 can optionally include wherein the hardware initialization code is according to a Unified Extensible Firmware Interface standard. In Example 24, the subject matter of any one of Examples 21-23 can optionally include wherein the executing comprises executing the hardware initialization code on the plurality of processor cores in parallel using the portion of the cache as the static memory to initialize the system.

In Example 25, the subject matter of any one of Examples 21-24 can optionally include wherein the cache is shared by the plurality of processor cores and a graphics core. In Example 26, the subject matter of any one of Examples 21-25 can optionally include wherein the dynamic memory comprises dynamic random access memory (DRAM). In Example 27, the subject matter of any one of Examples 21-26 can optionally include wherein the portion of the cache as the static memory is locked down subsequent to execution of the hardware initialization code to prevent access to the portion.

Example 28 is an apparatus for facilitating improving boot process for early display initialization and visualization, according to implementations of the disclosure. The apparatus of Example 28 can comprise means for powering on a system comprising a plurality of processor cores coupled to a cache; means for initializing, by a controller of the system, a portion of the cache as static memory for hardware initialization code usage before beginning execution of the hardware initialization code; means for executing the hardware initialization code on one or more of the plurality of processor cores to initialize the system; means for performing display initialization using memory from the portion of the cache initialized as the static memory, the display initialization performed independently of initialization of dynamic memory of the system; and means for transferring control of execution of the system from the hardware initialization code to operating system code executing on the system.

In Example 29, the subject matter of Example 28 can optionally include the apparatus further configured to perform the method of any one of the Examples 22 to 27.

Example 30 is at least one machine-readable medium comprising a plurality of instructions that in response to being executed on a computing device, cause the computing device to carry out a method according to any one of Examples 21-27. Example 31 is an apparatus for facilitating improving boot process for early display initialization and visualization, configured to perform the method of any one of Examples 21-27. Example 32 is an apparatus for facilitating improving boot process for early display initialization and visualization comprising means for performing the method of any one of claims 21 to 27. Specifics in the Examples may be used anywhere in one or more embodiments.

In the description above, for the purposes of explanation, numerous specific details are set forth in order to provide a thorough understanding of the described embodiments. It will be apparent, however, to one skilled in the art that embodiments may be practiced without some of these specific details. In other instances, well-known structures and devices are shown in block diagram form. There may be intermediate structure between illustrated components. The components described or illustrated herein may have additional inputs or outputs that are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium (e.g., non-transitory computer-readable storage medium) having stored thereon computer program instructions, which may be used to program a computer (or other electronic devices) for execution by one or more processors to perform a process according to certain embodiments. The computer-readable medium may include, but is not limited to, magnetic disks, optical disks, read-only memory (ROM), random access memory (RAM), erasable programmable read-only memory (EPROM), electrically-erasable programmable read-only memory (EEPROM), magnetic or optical cards, flash memory, or other type of computer-readable medium suitable for storing electronic instructions. Moreover, embodiments may also be downloaded as a computer program product, wherein the program may be transferred from a remote computer to a requesting computer.

Many of the methods are described in their basic form, but processes can be added to or deleted from any of the methods and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example. Reference in the specification to "an embodiment," "one embodiment," "some embodiments," or "other embodiments" means that a particular feature, structure, or characteristic described in connection with the embodiments is included in at least some embodiments. The various appearances of "an embodiment," "one embodiment," or "some embodiments" are not all referring to the same embodiments. It should be appreciated that in the foregoing description of example embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments utilize more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

What is claimed is:

1. A hardware processor comprising:
a plurality of processor cores;
a cache coupled to the plurality of processor cores; and
a controller circuit to:
responsive to a power on of the hardware processor, initialize a portion of the cache as static memory for hardware initialization code usage prior to execution of the hardware initialization code, wherein the portion of cache is initialized as the static memory without using cache-as-random-access-memory (CAR); and
execute the hardware initialization code using the static memory of the portion of the cache, the hardware initialization code to cause initialization of a display device to be performed for display device initialization and bring up;
wherein initialization and training of dynamic memory of the hardware processor occurs prior to booting to an operation system (OS) and occurs independently of and in parallel with initialization of the display device that utilizes the static memory.

2. The hardware processor of claim 1, wherein the hardware initialization code is according to a Basic Input/Output System standard.

3. The hardware processor of claim 1, wherein the hardware initialization code is according to a Unified Extensible Firmware Interface standard.

4. The hardware processor of claim 1, wherein the hardware initialization code executes on the plurality of processor cores in parallel using the static memory of the portion of the cache.

5. The hardware processor of claim 1, wherein the cache is shared by the plurality of processor cores and a graphics core.

6. The hardware processor of claim 1, wherein the cache is an L4 cache.

7. The hardware processor of claim 1, wherein the dynamic memory comprises dynamic random access memory (DRAM).

8. The hardware processor of claim 1, wherein the portion of the cache as the static memory is locked down subsequent to execution of the hardware initialization code to prevent access to the portion.

9. A non-transitory machine-readable medium comprises executable computer program instructions that, when executed by one or more processors, cause the one or more processors to perform operations comprising:

powering on a system comprising a plurality of processor cores coupled to a cache;
initializing, by a controller of the system, a portion of the cache as static memory for hardware initialization code usage prior to execution of the hardware initialization code, wherein the portion of cache is initialized as the static memory without using cache-as-random-access-memory (CAR);
executing the hardware initialization code on one or more of the plurality of processor cores to initialize the system;
performing display device initialization using the static memory from the portion of the cache, the hardware initialization code to cause initialization of a display device to be performed for display device initialization and bring up, wherein initialization and training of dynamic memory of the system occurs prior to booting to an operation system (OS) and occurs independently of and in parallel with initialization of the display device that utilizes the static memory; and
transferring control of execution of the system from the hardware initialization code to operating system code executing on the system.

10. The non-transitory machine-readable medium of claim 9, wherein the hardware initialization code is according to a Basic Input/Output System standard.

11. The non-transitory machine-readable medium of claim 9, wherein the hardware initialization code is according to a Unified Extensible Firmware Interface standard.

12. The non-transitory machine-readable medium of claim 9, wherein the executing comprises executing the hardware initialization code on the plurality of processor cores in parallel using the static memory of the portion of the cache to initialize the system.

13. The non-transitory machine-readable medium of claim 9, wherein the cache is shared by the plurality of processor cores and a graphics core.

14. The non-transitory machine-readable medium of claim 9, wherein the dynamic memory comprises dynamic random access memory (DRAM).

15. The non-transitory machine-readable medium of claim 9, wherein the portion of the cache as the static memory is locked down subsequent to execution of the hardware initialization code to prevent access to the portion.

16. A system comprising:
a hardware processor comprising a plurality of processor cores;
a cache coupled to the hardware processor;
storage for hardware initialization code; and
a controller circuit to:
responsive to a power on of the hardware processor, initialize a portion of the cache as static memory for hardware initialization code usage prior to execution of the hardware initialization code, wherein the portion of cache is initialized as the static memory without using cache-as-random-access-memory (CAR); and
execute the hardware initialization code using the static memory of the portion of the cache, the hardware initialization code to cause initialization of a display device to be performed for display device initialization and bring up;
wherein initialization and training of dynamic memory of the hardware processor occurs prior to booting to an operation system (OS) and occurs independently of and in parallel with initialization of the display device that utilizes the static memory.

17. The system of claim 16, wherein the hardware initialization code is according to a Basic Input/Output System standard.

18. The system of claim 16, wherein the hardware initialization code is according to a Unified Extensible Firmware Interface standard.

19. The system of claim 16, wherein the hardware initialization code executes on the plurality of processor cores in parallel using the static memory of the portion of the cache.

20. The system of claim 16, further comprising a graphics core, and the cache is shared by the plurality of processor cores and the graphics core.

* * * * *